United States Patent
Ensinger

[11] Patent Number: 5,945,048
[45] Date of Patent: Aug. 31, 1999

[54] PROCESS AND DEVICE FOR EXTRUDING POLYMER MELTS TO FORM HOLLOW CHAMBER SECTIONS

[76] Inventor: Wilfried Ensinger, Rudolf-Diesel-Strasse 8, D-71154 Nufringen, Germany

[21] Appl. No.: 08/962,947

[22] Filed: Sep. 25, 1997

Related U.S. Application Data

[63] Continuation of application No. PCT/EP96/00884, Mar. 2, 1996.

[30] Foreign Application Priority Data

Mar. 25, 1995 [DE] Germany .................... 195 10 944

[51] Int. Cl.[6] .................... B29C 44/24; B29C 47/90
[52] U.S. Cl. .................... 264/46.1; 264/46.6; 264/209.4; 264/572; 425/4 C; 425/72.1; 425/130; 425/325
[58] Field of Search .................... 264/45.9, 209.4, 264/46.1, 46.6, 572; 425/325, 72.1, 4 C, 130

[56] References Cited

U.S. PATENT DOCUMENTS

| | | |
|---|---|---|
| 3,182,108 | 5/1965 | Branscum . |
| 3,212,135 | 10/1965 | Branscum . |
| 3,668,288 | 6/1972 | Takahashi . |
| 3,713,762 | 1/1973 | Oisugu .................... 264/45.9 |
| 3,792,951 | 2/1974 | Meyers . |
| 3,845,189 | 10/1974 | Nackaerts .................... 425/325 |
| 3,857,914 | 12/1974 | Aishima et al. .................... 264/45.9 |
| 4,160,638 | 7/1979 | Kolossow .................... 264/209.4 |
| 4,198,363 | 4/1980 | Noel .................... 264/45.9 |
| 4,314,958 | 2/1982 | Macleod et al. .................... 264/209.4 |
| 4,364,882 | 12/1982 | Doucet .................... 264/209.4 |
| 4,397,797 | 8/1983 | Nojiri et al. .................... 264/45.9 |
| 4,402,658 | 9/1983 | Larsen .................... 425/325 |
| 4,459,250 | 7/1984 | Miura et al. .................... 264/45.9 |
| 4,465,449 | 8/1984 | Hornbeck .................... 264/45.9 |
| 4,565,723 | 1/1986 | Hirsch .................... 264/45.9 |
| 4,657,715 | 4/1987 | Myers et al. .................... 264/45.9 |
| 4,731,002 | 3/1988 | Spence et al. .................... 264/45.9 |
| 4,919,864 | 4/1990 | Knaus .................... 264/45.9 |
| 5,124,096 | 6/1992 | Brambilla .................... 264/45.9 |
| 5,132,062 | 7/1992 | Brambilla .................... 264/45.5 |
| 5,281,377 | 1/1994 | Iwano et al. .................... 264/209.4 |
| 5,529,731 | 6/1996 | Bendick et al. .................... 264/46.9 |
| 5,792,481 | 8/1998 | Cretti .................... 425/4 C |

FOREIGN PATENT DOCUMENTS

| | | |
|---|---|---|
| 0 275 162 | 7/1988 | European Pat. Off. . |
| 2 287 322 | 5/1976 | France . |
| 32 41 005 | 8/1984 | Germany .................... 264/209.4 |

OTHER PUBLICATIONS

Publication JP 55087535 dated Jul. 2, 1980, *Patent Abstracts of Japan*, vol. 4, No. 128.

*Primary Examiner*—Allan R. Kuhns
*Attorney, Agent, or Firm*—Barry R. Lipsitz; Ralph F. Hoppin

[57] ABSTRACT

In a process for extruding polymer melts (25) to form hollow chamber sections (21) by pressing the polymer melt through a shaping tool (24) with an internal shaping mandrel (26) and by subsequently sizing and cooling the hollow chamber section strand in a sizing and cooling unit (31) it is provided for the sizing and cooling of the hollow chamber section strand to be carried out in the sizing and cooling unit under extrusion pressure. A device for carrying out this process is characterized in that shaping tool (24) and sizing and cooling unit (31) are rigidly connected to form a closed system so that the strand extrusion pressure prevailing in the shaping tool can be propagated into the sizing and cooling unit, and that the shaping mandrel (26) protrudes out of the shaping tool (24) into the sizing and cooling unit (31).

18 Claims, 6 Drawing Sheets

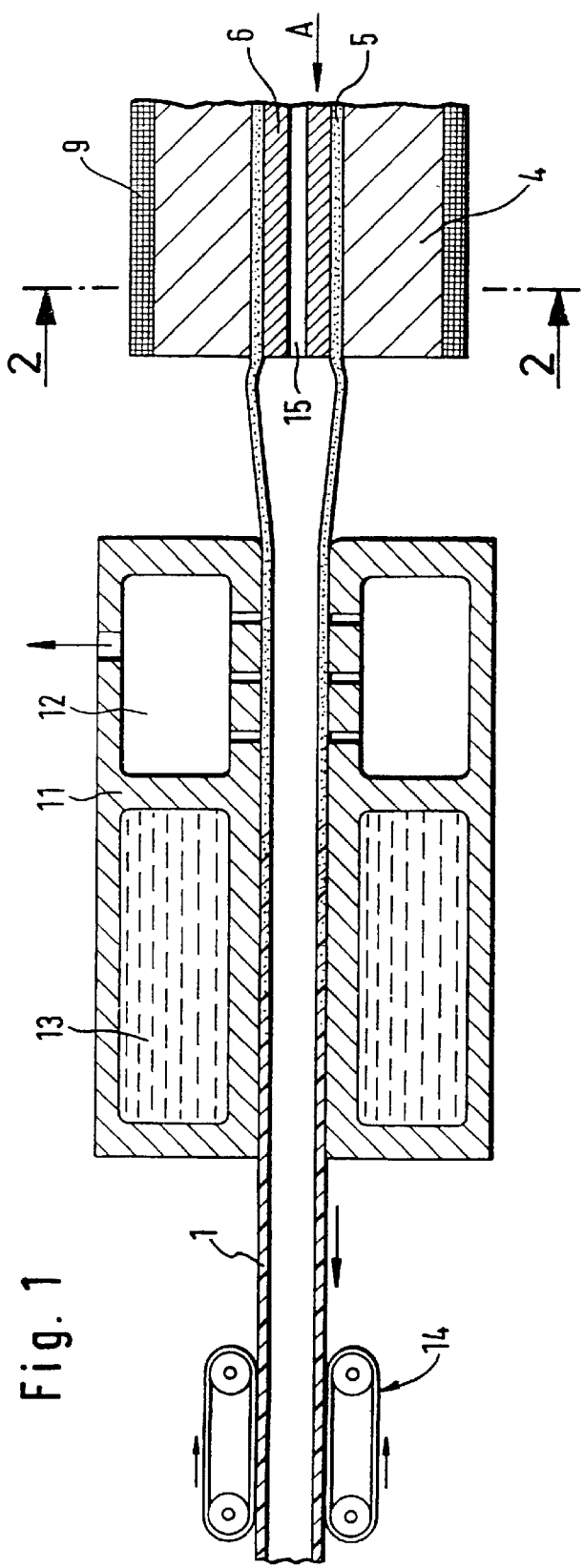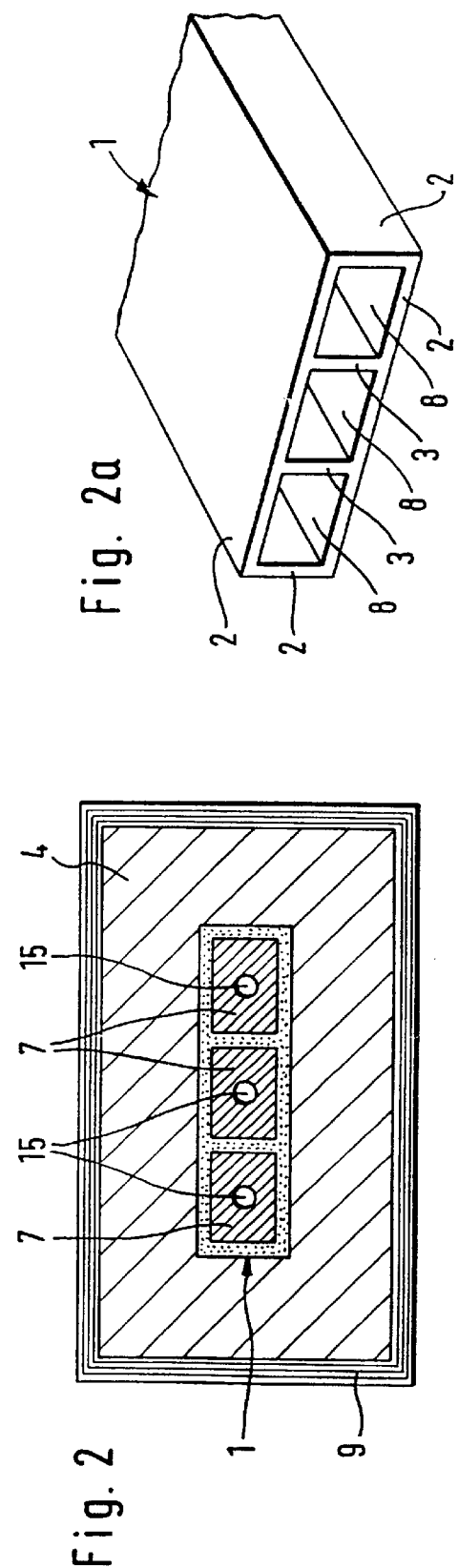

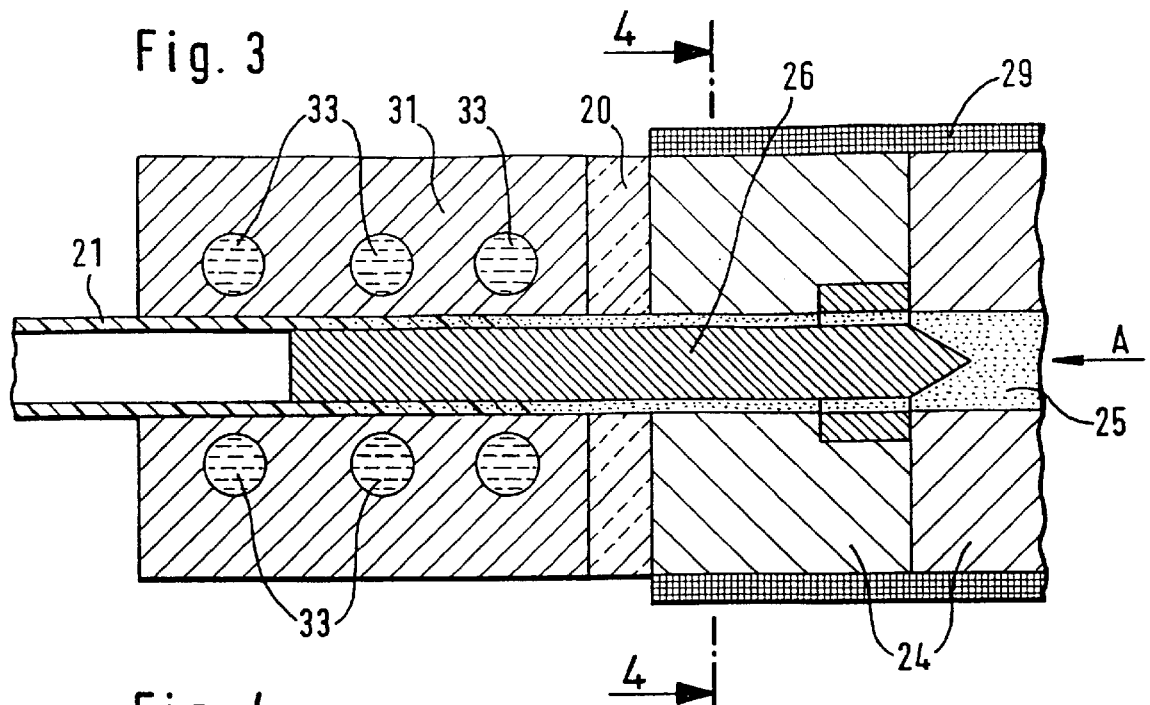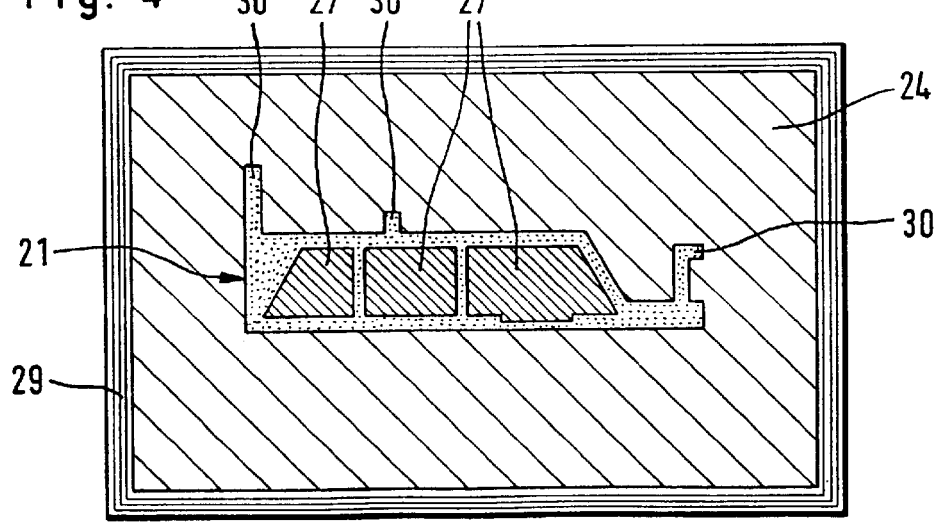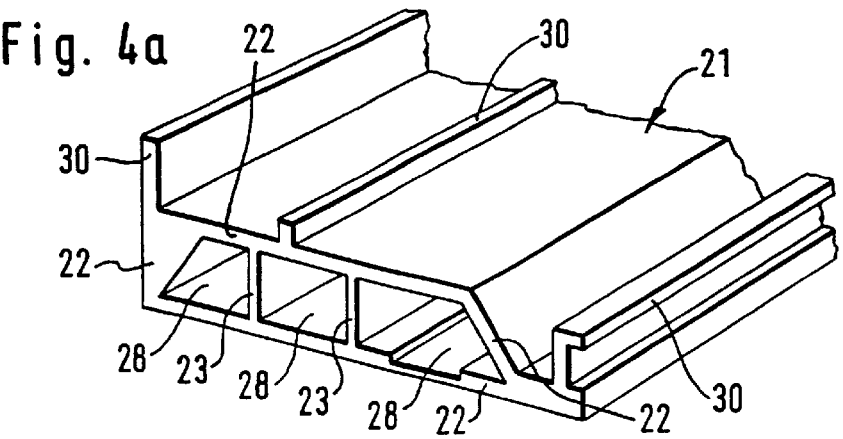

PROCESS AND DEVICE FOR EXTRUDING POLYMER MELTS TO FORM HOLLOW CHAMBER SECTIONS

This application is a continuation of PCT/EP96/008 filed Mar. 2, 1996, for the entire specification of which is incorporated herein by reference.

BACKGROUND OF THE INVENTION

The invention relates to a process for extruding polymer melts to form hollow chamber sections by pressing the polymer melt through a heated shaping tool with an internal shaping mandrel, wherein shaping tool and shaping mandrel determine the outer and inner contours of the hollow chamber section, and by subsequently sizing and cooling the hollow chamber section strand exiting from the shaping tool in a sizing and cooling unit. In addition, the invention relates to a device for carrying out such a process, comprising a shaping tool which contains an internal shaping mandrel and a sizing and cooling unit.

Economic aspects very often require hollow chamber sections to be produced instead of solid sections because material can be saved by this and a greater production speed can be used. However, in the case of hollow chamber sections greater requirements have to be met with respect to measurement, shape and functional accuracy and these are not always easy to fulfill. In the case of known processes and devices for extruding polymer melts to form hollow chamber sections (Michaeli "Extrusionswerkzeuge für Kunststoffe", 1991, in particular pgs. 194 to 197) the following, restrictive conditions, in particular, have to be fulfilled inter alia: The profile cross section is intended to be kept as simple as possible, wherein interior webs are to be avoided if at all possible. The wall thickness of interior webs should be selected to be around 20 to 30% smaller than the wall thickness of the outer wall. The section should be designed such that it retains its shape for a short time after exiting from the tool, even in the plastic state. Material accumulations and cracks in the wall thickness are to be avoided since these make the control of the melt flow distribution in the tool difficult, and problems result during cooling (sunk spots on account of varying shrinkage and warping of the section). The cavities in the hollow chamber section should not be too small as, otherwise, the bodies (mandrels) displacing the melt are too small and cannot be adequately guided. Finally, the section axis is intended to be located in the worm shaft of the extruder used in order to keep flow path differences as small as possible.

For the production of the known hollow chamber sections, so-called monoextrusion tools are used, which are followed by sizing and cooling units as separate units in a spatially separated manner, wherein a vacuum is often used for the sizing. As a result of the spatial separation of shaping tool, on the one hand, and sizing and cooling unit, on the other hand, the shaped melt passes without pressure into the last-named unit and is there shaped and cooled without pressure and under vacuum. In the intermediate space between shaping tool and sizing and cooling unit, where ambient temperature and atmospheric pressure naturally prevail, the extruded hollow chamber section, which exits from the shaping tool and is intended to be as small as possible in order to be able to adjust it again in a simple manner in the sizing and cooling unit, will generally swell out.

All these restrictions and conditions result in the fact that up to now only relatively simple hollow chamber sections could be produced while, in the case of hollow chamber sections with complicated cross-sectional shapes, the requirements with respect to accuracy and dimensional stability could be met only with difficulty.

A related process is known from DE-24 34 381A1. This publication relates to the production of a hollow chamber section with closed cells, i.e. without axially continuous hollow chambers. The cooling obviously takes place not at strand extrusion pressure but at atmospheric pressure.

U.S. Pat. No. 3,182,108 discloses a process for extruding tubes from polymers having only one single hollow chamber, wherein in a sizing and cooling unit a wall made porous, for example, by openings abuts either on the outer or inner side of the extruded pipe, a degasification of the extrudate taking place through this wall. On account of the difference in pressure required for the degasification, the extrudate cannot be subject to extrusion pressure in the sizing and cooling unit.

It is known from U.S. Pat No. 5,132,062 to extrude a foamed polymer material to form simple hollow sections, for example to form tubing without axially extending inner webs. A polymer material cannot, as is well known, foam under strand extrusion pressure. For foaming, it is, on the contrary, necessary to relieve the pressure to such an extent that the foam can form in the shaped cavities available for this. For this reason, U.S. Pat. No. 5,132,062 also does not disclose any sizing and cooling of a hollow section strand under strand extrusion pressure since, in this case, only foamed polymer material is used. Only simple profile cross sections, for example tubes, can be produced with this known process.

SUMMARY OF THE INVENTION

The object underlying the invention is to design a generic process and a generic device such that very complex, unsymmetric hollow profile cross sections, the section axes of which can also be located outside the worm shaft of the extruder used, and the outer walls and inner webs of which can have different dimensions and shapes, sharp edges, undercuts and thickness flaws, can also be produced with the greatest precision, i.e. without sunk spots and vacuoles.

The object is accomplished in an inventive process in that a hollow chamber section with axially continuous hollow chambers and, in particular, with different outer wall and inner web thicknesses is extruded and the sizing and cooling of the hollow chamber section strand is carried out in the sizing and cooling unit under extrusion pressure.

A device for carrying out this process is characterized in accordance with the invention in that the shaping tool containing the shaping mandrel is rigidly connected to the sizing and cooling unit to form a closed system such that the strand extrusion pressure prevailing in the shaping tool is propagated into the sizing and cooling unit, and that the shaping mandrel of the shaping tool protrudes into the sizing and cooling unit.

The following description of preferred embodiments of the invention serves to explain the invention in greater detail in conjunction with the attached drawings.

BRIEF DESCRIPTION OF THE DRAWINGS

FIG. 1 a schematized sectional view of a conventional device for extruding polymer hollow chamber sections;

FIG. 2 a sectional view along line 2—2 in FIG. 1;

FIG. 2a a diagrammatic partial view of a hollow chamber section, produced with the device according to FIGS. 1 and 2;

FIG. 3 a schematic sectional view of an inventive device for extruding polymer hollow chamber sections;

FIG. 4 a sectional view along line 4—4 in FIG. 3;

FIG. 4a a diagrammatic partial view of a hollow chamber section, produced with the device according to FIGS. 3 and 4;

DETAILED DESCRIPTION OF THE INVENTION

Figure 5:
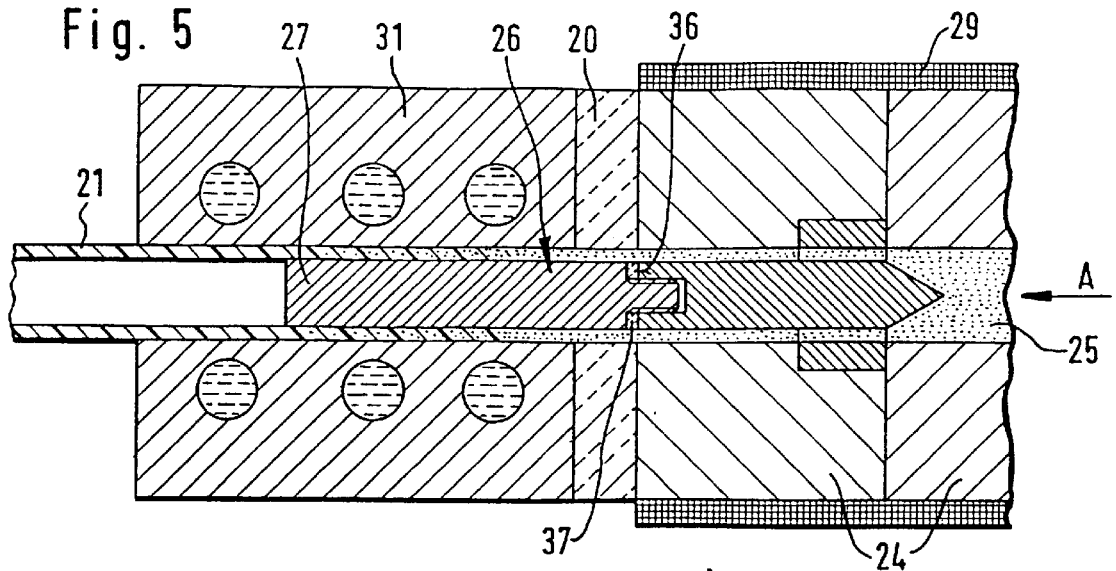
FIG. 5 a modified device, similar to FIG. 3, with a multiple-part shaping mandrel.

A conventional device for extruding polymer melts to form hollow chamber sections is illustrated schematically in FIGS. 1 and 2. With this device, a hollow chamber section 1 having the cross-sectional shape illustrated in FIG. 2a with outer walls 2 and inner webs 3 can, for example, be produced. The device comprises a shaping tool 4 (nozzle) which is arranged on an extruder (not illustrated), e.g. a worm extruder, proceeding from which a polymer melt 5 is pressed through the tool 4 with an extruding pressure which can be adjusted in a conventional manner. The shaping tool 4 has in its relatively spacious, rectangular exit opening, which determines the outer contour of the hollow chamber section 1, a shaping mandrel 6 which comprises three fingers 7 (FIG. 2) which, for their part, determine the inner contour of the hollow chamber section 1, i.e., in particular, the three cavities 8 located next to one another. The shaping tool 4 is outwardly enclosed by a heating device 9. The heated, plasticized polymer melt 5 flows through the tool 4 in the direction of arrow A.

A sizing and cooling unit 11, into which the polymer melt 5 shaped to form the hollow chamber section 1 enters in order to be sized and cooled therein, is arranged at the exit side of the shaping tool 4, in spaced relationship thereto. The sizing takes place with the aid of a vacuum device 12, which is indicated only schematically and with the aid of which the outer walls 2 of the section 1 are held on the inner walls of the sizing and cooling unit 11 acting as a "slip mold" while the section 1 is advanced through the unit 11. With the aid of a cooling device 13 which is likewise indicated only schematically in FIG. 1, the hollow chamber section 1 is cooled in the sizing and cooling unit to approximately room temperature.

The finished hollow chamber section 1 is withdrawn by means of a take-up device 14 which is arranged behind the sizing and cooling unit 11 in flow direction (arrow A).

Room temperature and atmospheric pressure essentially prevail in the space between the shaping tool 4 and the sizing and cooling unit 11. As soon as the polymer melt 5 has left the shaping tool 4, it becomes "pressure-less" so that the hollow chamber section 1 passes through the space between shaping tool 4 and sizing and cooling unit 11 without pressure. Furthermore, the sizing and cooling takes place in the unit 11 under vacuum without pressure.

The shaping mandrel 6 essentially reaches exactly as far as the exit opening of the shaping tool 4, from which the polymer melt 5 shaped to form the hollow chamber section 1 exits. As illustrated, lines 15 are formed in the fingers 7 of the mandrel 6, via which air, where necessary compressed air, can be introduced into the hollow chambers 8 of the hollow chamber section 1.

FIGS. 3 and 4 show the fundamental design of a device according to the invention for extruding polymer melts to form hollow chamber sections. A typical hollow chamber section 21 produced with the device according to FIGS. 3 and 4 is illustrated in FIG. 4a. It comprises outer walls 22 and inner webs 23 which, together with the outer walls 22, enclose three continuous hollow chambers 28, wherein the inner webs 23 are designed to be thinner than the outer walls 22. Moreover, the section 21 has externally located webs 30, the cross-sectional shape of which is apparent from FIG. 4a.

As is shown in FIGS. 3 and 4, the device comprises a shaping tool 24, in which a polymer melt 25 is shaped under strand extrusion pressure, to form a hollow chamber section 21. The shaping tool 24 is again arranged on a conventional extruder. The tool 24 contains in a cavity, the inner walls of which determine the outer contour of the hollow chamber section 21, a shaping mandrel 26 with three fingers 27 which are arranged in mutual spaced relationship to one another and are of equal length (FIG. 4). The fingers 27 determine the inner contour of the hollow chamber section 21, wherein the webs 23 of the section 21 are formed in the spaces between the fingers 27. The mandrel 26 consisting of the fingers 27 is rigidly anchored in the shaping tool 24. The polymer melt 25 can comprise unfoamed or non-foaming thermoplastic, duroplastic or elastomeric polymers, e.g. polyamide, polypropylene, polyester; phenolic resin, polymers on an epoxy resin basis; polyurethane. The strand extrusion pressure is always greater than 1 bar, e.g. between 2 and several hundred bars, preferably 20 to 200 bars, in particular 30–100 bars. It depends on the polymer used, on the wall thicknesses of the section produced and on fiber reinforcements and other fillers in the polymer. In particular in the case of fiber reinforcements (e.g. glass or carbon fibers), high pressures, e.g. 200 bars, are used.

With an insulating board 20 connected therebetween, which can also, where necessary, be left out, a sizing and cooling unit 31 is connected directly to the shaping tool 24 and is rigidly connected to the tool 24 to form a closed system. The actual design of the sizing and cooling unit 31 can be conventional, i.e., for example, such as in the case of the sizing and cooling unit 11 illustrated in FIG. 1. In FIG. 3, only a cooling through lines 33 is indicated, the sizing can take place with the aid of a vacuum in a manner which is not illustrated.

Since the sizing and cooling unit 31 is rigidly connected to the shaping tool 24, thereby forming a closed system, the strand extrusion pressure, to which the hollow chamber section 21 extruded from the shaping tool 4 is subject, propagates into the sizing and cooling unit 31 so that essentially the same pressure prevails in this unit, at least in the regions of the unit 31 and the board 20 adjacent to the tool 24, and the polymer melt is sized in this unit 31 at this pressure and caused to be shaped. This a first, essential difference to the conventional device shown in FIG. 1, with which the shaping of the polymer melt takes place in the sizing and cooling unit without pressure. It has been shown that as a result of the hardening under pressure of the polymer melt 25 forming the hollow chamber section 21 in the sizing and cooling unit 31 a considerably greater shape retention and stability of this section can be achieved.

As is apparent, in addition, from FIG. 3, the shaping mandrel 26 extends with its fingers 27 relatively far into the sizing and cooling unit 31 so that the shaping of the hollow chamber section 21 caused by the mandrel 26 and its fingers 27 also continues right into the sizing and cooling unit 31. This is an additional reason for the fact that essentially more complex, unsymmetric profile cross sections, the section axes of which can, for example, be located outside the worm shaft of an extruder, can be produced with the device according to FIGS. 3 and 4 precisely and without sunk spots and vacuoles and with very narrow tolerances, which was not previously possible. In the case of conventional hollow chamber sections, there was, for example, the difficulty of subsequently introducing insertions, e.g. wooden strips, into one or other of the hollow chambers 8 (FIG. 2a) because considerable tolerances occurred in these hollow chambers. Hollow chamber sections 21 which are produced with the device according to FIGS. 3 and 4 have hollow chambers 28 with, overall, exact nominal dimensions so that insertions can be positioned in them without difficulty. The shaping tool 24 itself is again enclosed by a heating device 29 which corresponds to the heating device 9 in FIGS. 1 and 2.

The device according to FIG. 5 differs from that according to FIGS. 3 and 4 only in that the shaping mandrel 26 with its fingers 27 is not of a one-piece design but consists of several parts. FIG. 5 shows a point of separation 36, at which the parts of the fingers 27 located in the sizing and cooling unit 31 can be connected, e.g. by screws, to the part of the mandrel 26 which is arranged in the actual shaping tool 24. Insulating elements 37 can be inserted between the individual parts during the connection of these mandrel parts.

Figure 6:
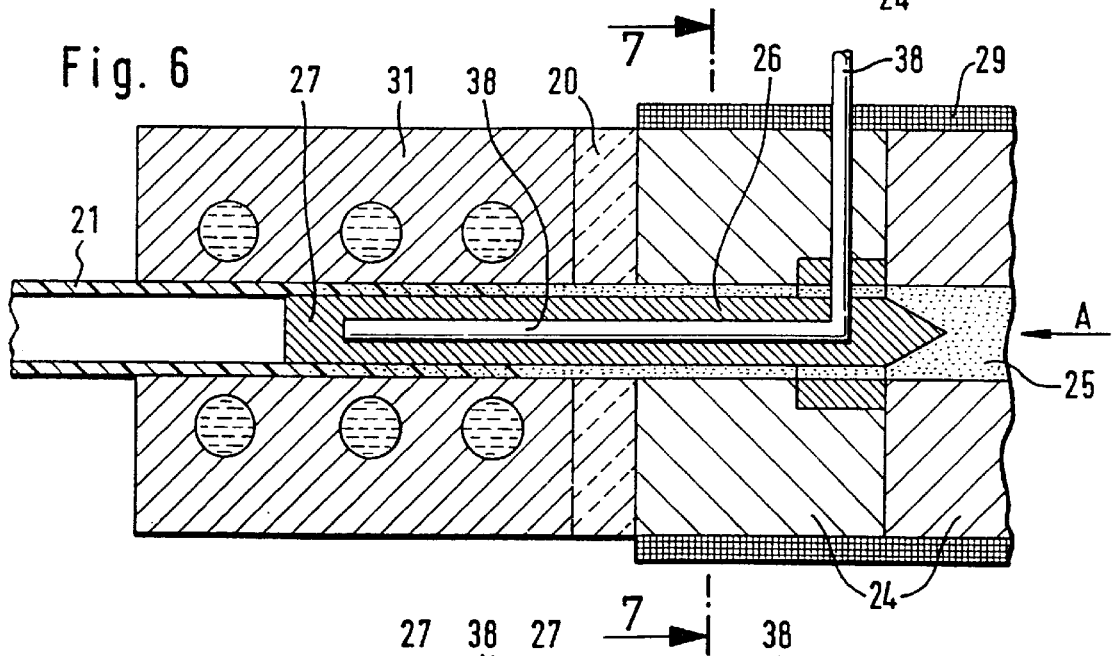
FIG. 6 a different embodiment of a device similar to FIG. 3 with attemperated shaping mandrel.
Figure 7:
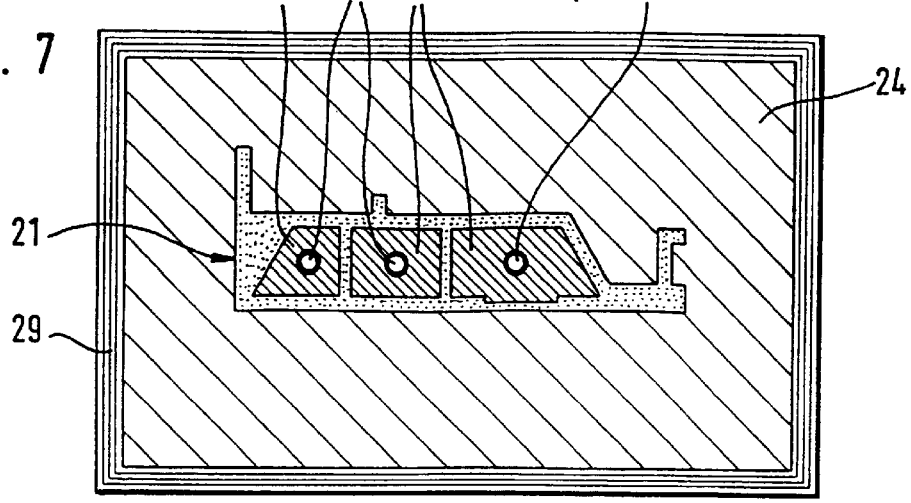
FIG. 7 a sectional view along line 7—7 in FIG. 6.

The device illustrated in FIGS. 6 and 7 again corresponds for the most part to the device according to FIG. 3. In contrast to FIG. 3, the mandrel 26 and its fingers 27 are, however, not designed in FIGS. 6 and 7 to be solid but they contain heating or cooling lines 38 (merely indicated schematically in FIGS. 6 and 7), via which the mandrel 26 with its fingers 27 can be attemperated in a selective manner, i.e. cooled or heated, with the aid of a suitable medium.

Figure 8:
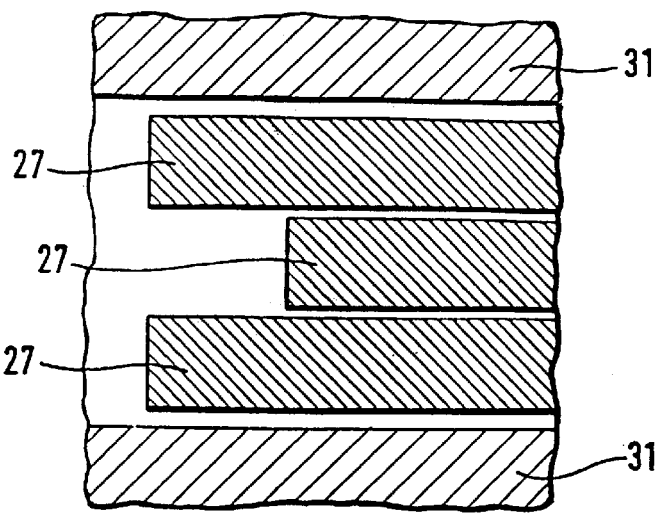
FIG. 8 a schematic sectional view of a modified shaping mandrel with fingers of different lengths.

FIG. 8 shows schematically in a sectional view of the sizing and cooling unit 31 (at right angles to the sectional view according to FIGS. 4 and 7) a mandrel, the fingers 27 of which have different lengths in the region of the unit 31. As a result of this, different section wall thicknesses can be produced, as well as extrusion pressures and cooling capacities, in a selective manner, whereby the accuracy of the hollow chamber section 21 produced is again increased.

Figure 9:
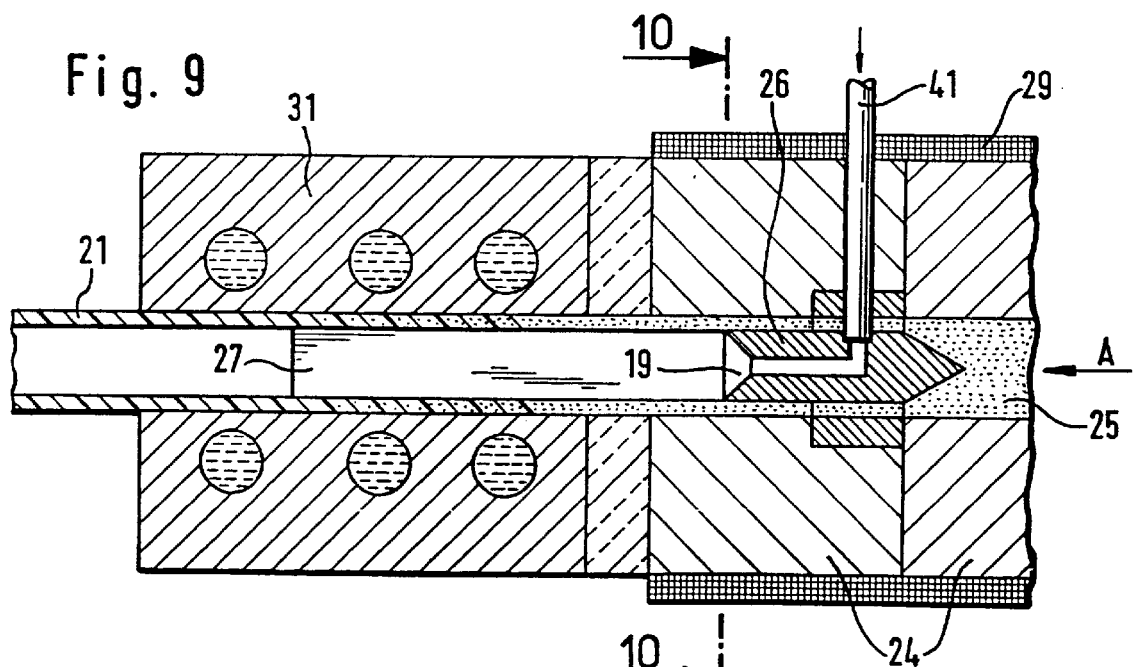
FIG. 9 a device similar to FIG. 3 with the possibility of introducing additional polymer into the hollow chamber section formed.
Figure 10:
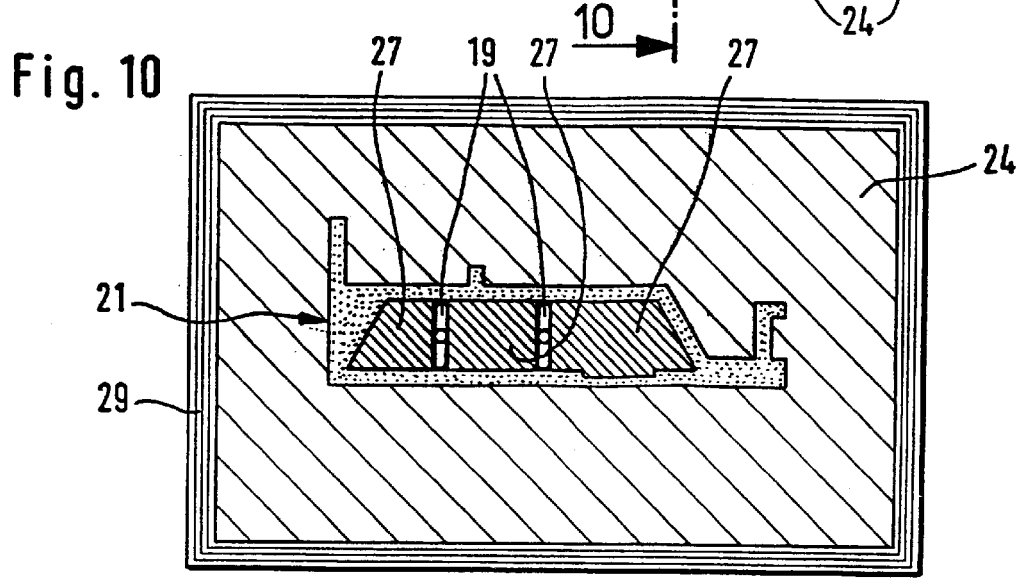
FIG. 10 a sectional view along line 10—10 in FIG. 9.

In the case of the, again, modified embodiment of an extrusion device according to the invention, which is shown in FIGS. 9 and 10, an additional polymer melt, from which certain parts of the section 21 are formed, can be introduced under pressure via an auxiliary line 41 which is connected to a side or auxiliary extruder outside the shaping tool 24, wherein the pressure of this additional melt can be different to that of the polymer melt 25 forming the main strand. As illustrated schematically in FIGS. 9 and 10, the exit 19 of the auxiliary lines 41 is respectively designed and arranged such that the additional polymer melt exiting therefrom forms the intermediate walls or webs 23 of the hollow chamber section 21. In an analogous manner, other areas of the hollow chamber section 21 could also be formed from an additional polymer melt or also from a combination of this additional polymer melt with the polymer melt 25 supplied as main strand.

It is also possible to attach stationary flow obstacles in the flow path of the polymer melt in the region of the mandrel 26 and its fingers 27, these obstacles resulting in a selective anisotropy of the solidified polymer filled, in particular, with additional materials, e.g. glass fibers, whereby certain functional properties of the hollow chamber section 21 can likewise be regulated.

Figure 11:
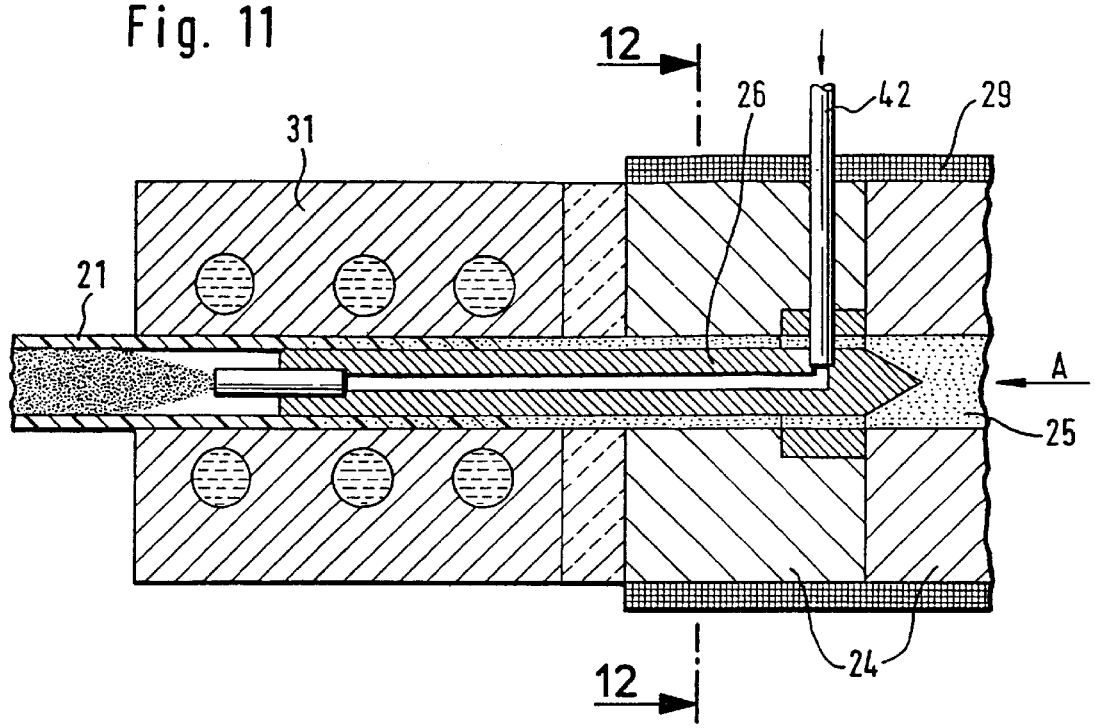
FIG. 11 a device again modified in comparison with FIG. 3 with the possibility of introducing an additional component into the cavity or cavities of the hollow chamber section.
Figure 12:
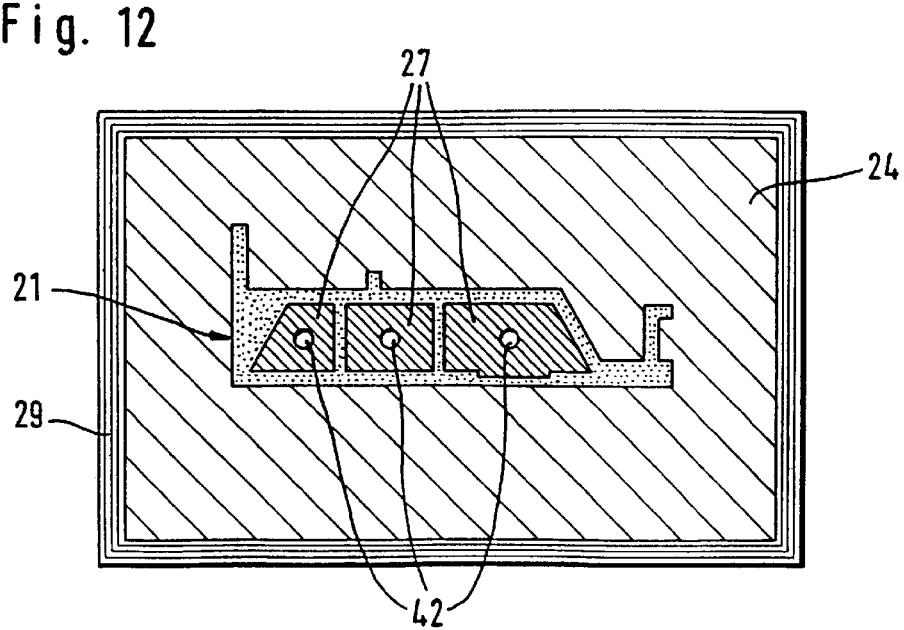
FIG. 12 a sectional view along line 12—12 in FIG. 11.

FIGS. 11 and 12 show an extrusion device 24, with which, in contrast to FIGS. 9 and 10, auxiliary lines 42 are not arranged between the fingers 27 of the shaping mandrel 26 but in the fingers 27 themselves. In this way, it is possible to introduce certain additional components, in particular, foamable polymer components as well, into the hollow chambers 28 of the hollow chamber section 21, namely into the gradually solidifying or already hardened hollow chamber section 21 and in the same operating step as the actual extrusion process, depending on the length of the line 42 which, as illustrated in FIG. 11, can also protrude beyond the front end side of the mandrel 26. The additional component serving as filler need not be filled into all the hollow chambers 28 of the hollow chamber section 21. In certain cases, it may be sufficient to fill only one single hollow chamber 28 with such an additional component, e.g. a foamable polymer.

If a foamable component is used, the foam expansion forces occurring during foaming can be utilized as well in a selective manner for the shaping and sizing of the hollow chambers 28 of the hollow chamber section 21.

Finally, in the case of the extrusion device illustrated in FIG. 13, which, again, essentially corresponds to the embodiment according to FIG. 3, a first sizing and cooling device 31 has a second such unit 43 connected to its outlet side, this second unit comprising, as in FIG. 1, a vacuum device 44 as well as a cooling device 45 and likewise having the hollow chamber section 21 passing through it.

Figure 13:
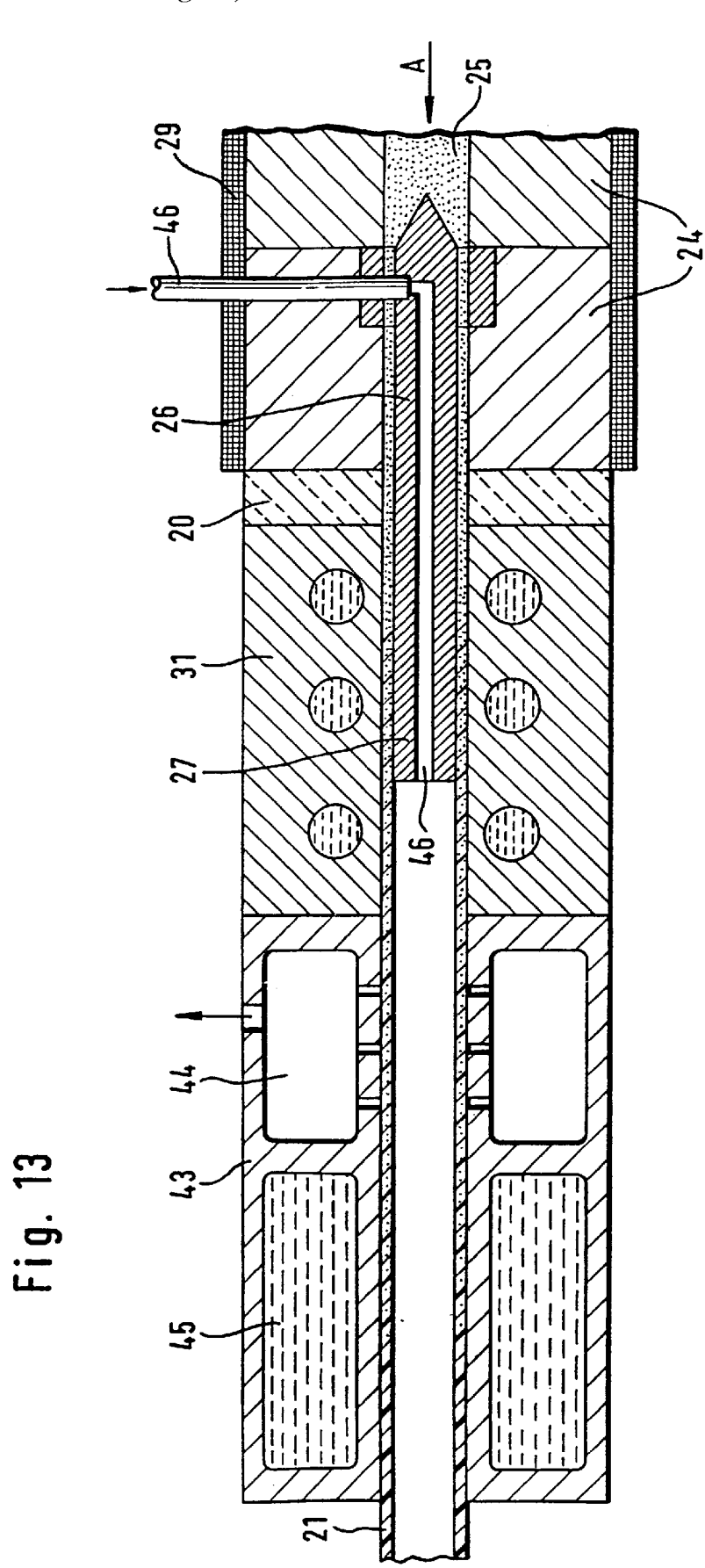
FIG. 13 a further modification of the device according to FIG. 3.

As is also apparent from FIG. 13, the individual fingers 27 of the mandrel 26, like in FIG. 1, have lines 46 passing through them which serve to introduce compressed air, the same as in the case of FIG. 1. This means that the sizing of the hollow chamber section 21 can be promoted from inside. Moreover, the compressed air can also aid the cooling of the hollow chamber section 21.

It is possible to produce several hollow chamber sections 21 at the same time next to one another in the manner described in that several devices, consisting of shaping tool 24, shaping mandrel 26 as well as sizing and cooling unit 31, are arranged next to one another or a single device of this type is provided with several exit openings for hollow chamber sections 21.

In the case of the embodiments described thus far, the mandrel is designed as a special part and inserted into the shaping tool 24 as well as the sizing and cooling unit 31. The mandrel 26 could, however, also be formed in one piece out of the tool 24, namely, in particular, when the hollow chamber sections are relatively uncomplicated. The mandrel can also, like shaping tool 24 and sizing and cooling unit 31 by means of the insulating board 20, be thermally separated from the shaping tool 24 by means of a corresponding insulating insert. The same result could also be achieved with contact surfaces between mandrel 26 and tool 24 which are reduced in size. Such reduced contact surfaces can also be formed between shaping tool 24 and sizing and cooling unit 31 in order to reduce the transfer of heat. The mandrel 26 with its fingers 27 can also be designed to be displaceable and stoppable in extrusion direction A.

What is claimed is:

1. A process for extruding a polymer melt to form a strand with hollow chamber sections, comprising the steps of:

pressing the polymer melt through a heated shaping tool under an extrusion pressure;

said heated shaping tool having an internal shaping mandrel for forming a plurality of hollow chamber sections in said strand;

wherein the shaping tool and shaping mandrel determine outer and inner contours of the hollow chamber sections;

extruding said strand from said shaping tool to provide said hollow chamber sections as axially continuous hollow chambers with outer walls and inner webs;

providing said extruded strand from said shaping tool to a sizing and cooling unit via a pressure-tight transition region wherein said extrusion pressure is essentially maintained;

and, subsequently, sizing and cooling the strand in the sizing and cooling unit while essentially maintaining the extrusion pressure.

2. A process as defined in claim 1, comprising the further step of:

introducing additional polymer melts under pressure in a region of the shaping mandrel.

3. A process as defined in claim 1, comprising the further step of:

introducing a foamable component into the hollow chamber(s) of the hollow chamber section as filler in a region of the shaping mandrel.

4. A process as defined in claim 1, comprising the further step of:

introducing compressed air into the hollow chamber(s) of the hollow chamber section in a region of the shaping mandrel.

5. A process as defined in claim 1, wherein:

said outer wall and inner web thicknesses are different from one another.

6. A device for extruding a polymer melt to form a strand with hollow chamber sections, comprising:

heated shaping tool containing an interior shaping mandrel for forming a plurality of hollow chamber sections in said strand;

means for pressing the polymer melt through said heated shaping tool under an extrusion pressure;

means for extruding said strand from said shaping tool to provide said hollow chamber sections as axially continuous hollow chambers with outer walls and inner webs;

a pressure-tight transition region; and a sizing and cooling unit; wherein:

said shaping tool containing the shaping mandrel is rigidly connected to the sizing and cooling unit via said pressure-tight transition region to form a closed system such that the strand extrusion pressure prevailing in the shaping tool is propagated into the sizing and cooling unit; and the shaping mandrel of the shaping tool protrudes into the sizing and cooling unit.

7. A device as defined in claim 6, further comprising:

an insulating board or contact surfaces arranged between the shaping tool and the sizing and cooling unit to provide said pressure-tight transition region.

8. A device as defined in claim 6, wherein:

the shaping mandrel is composed of several parts.

9. A device as defined in claim 6, wherein:

the shaping mandrel is adapted to be attemperated.

10. A device as defined in claim 6, wherein:

the shaping mandrel comprises several fingers of different lengths.

11. A device as defined in claim 6, wherein:

additional polymer melt is adapted to be introduced under pressure in a region of the shaping mandrel via an auxiliary line.

12. A device as defined in claim 6, wherein:

a line is formed in the shaping mandrel for introducing a foamable component into the hollow chamber(s) of the hollow chamber section.

13. A device as defined in claim 6, wherein:

a line is formed in the shaping mandrel for introducing compressed air into the hollow chamber(s) of the hollow chamber section.

14. A device as defined in claim 6, wherein:

the shaping mandrel is adapted to be displaced and stopped in an extrusion direction.

15. A device as defined in claim 6, further comprising:

means for introducing additional polymer melts under pressure in a region of the shaping mandrel.

16. A device as defined in claim 6, further comprising:

means for introducing a foamable component into the hollow chamber(s) of the hollow chamber section as filler in a region of the shaping mandrel.

17. A device as defined in claim 6, further comprising:

means for introducing compressed air into the hollow chamber(s) of the hollow chamber section in a region of the shaping mandrel.

18. A device as defined in claim 6, wherein:

said outer wall and inner web thicknesses are different from one another.

* * * * *